Figure 1:
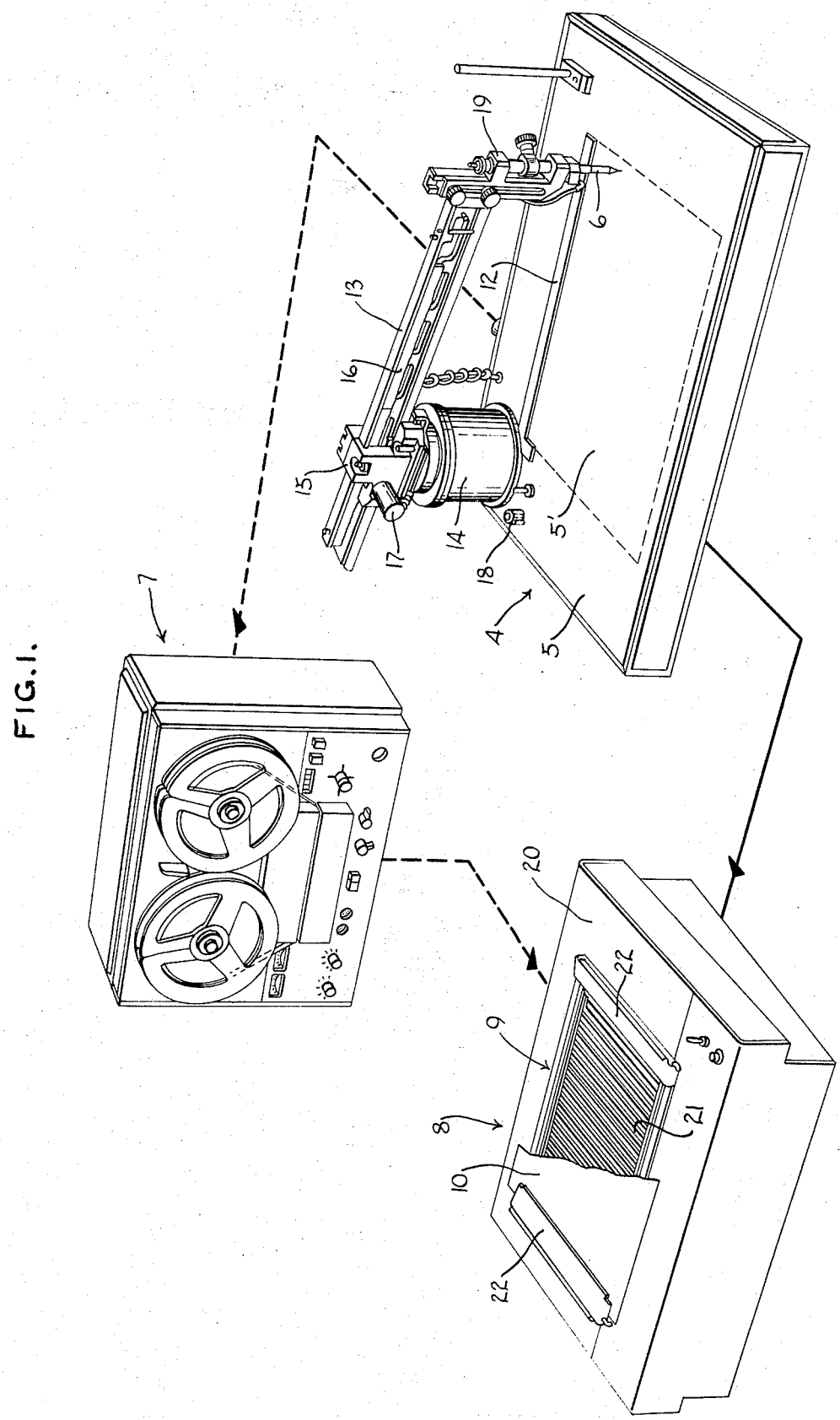

United States Patent [19]
Arrdal

[11] 3,768,180
[45] Oct. 30, 1973

[54] GRAPHIC FIGURE REPRODUCTION FOR VISUALLY IMPAIRED STUDENTS

[75] Inventor: Carl Borje Arrdal, Molnlycke, Sweden

[73] Assignee: Saab-Scania Aktiebolag, Linkaping, Sweden

[22] Filed: Feb. 9, 1972

[21] Appl. No.: 224,724

[52] U.S. Cl. .................................................. 35/38
[51] Int. Cl. ........................................ G09b 21/02
[58] Field of Search ............... 35/38, 37, 36, 35 A; 197/6.1; 178/6.6 B; 235/61.6 A, 61.6 B

[56] References Cited
UNITED STATES PATENTS

| | | | |
|---|---|---|---|
| 2,039,406 | 5/1936 | Greensfelder | 178/6.6 |
| 3,425,140 | 2/1969 | Dillon et al. | 35/36 |
| 3,289,327 | 12/1966 | Chevillon et al. | 35/35 A |

OTHER PUBLICATIONS

I.B.M. Technical Disclosure Bulletin, Vol. 11, No. 12, May 1969, page 1649.

*Primary Examiner*—Wm. H. Grieb
*Attorney*—Ira Milton Jones

[57] ABSTRACT

Recordable electric signals are produced by signal generating means connected with a tracing stylus that is guided over a graphic figure by a sighted person. Such signals control horizontal movements of a carriage that carries a striker pin, moving the pin in correspondence with stylus movements. As the carriage moves, the pin repeatedly thrusts up against deformable sheet material to produce therein a succession of raised projections that depict the traced figure in a manner detectable with the fingers.

3 Claims, 2 Drawing Figures

GRAPHIC FIGURE REPRODUCTION FOR VISUALLY IMPAIRED STUDENTS

This invention relates to teaching visually impaired persons, and the invention is more particularly concerned with a method and apparatus for communicating pictorial information to such persons.

In the instruction of a student having impaired vision, pictorial material such as maps, geometrical figures and the like must be communicated by means of special sheets on which forms and shapes to be studied are depicted in relief so that they can be detected with the fingers. Such relief sheets enable the student to perceive forms and shapes as they are being discussed and explained by an instructor in a classroom or by the spoken text of a recording.

Where the student must work with a collection of previously prepared relief sheets, he is always confronted with the need for finding the relief sheet appropriate to the subject under discussion. During classroom work, the instructor can help the student to find the correct relief sheet, but doing so takes a certain amount of the instructor's time that could be more profitably devoted to the actual teaching process. In individual study with so-called talking books, the visually impaired student ordinarily does not have the assistance of a sighted person to help him find the correct relief sheet, and the need to search for it is distracting. If he selects the wrong relief sheet, he may acquire an incorrect understanding that makes necessary a subsequent laborious unlearning and relearning process.

With these considerations in mind, it is a general object of this invention to provide apparatus by which a relief sheet can be very quickly produced, contemporaneously with a spoken explanation of the figure depicted on it, and whereby such production of a relief sheet can be controlled from a recording as well as personally by an instructor during a live presentation.

It is thus another object of this invention to provide teaching apparatus for visually impaired students who use relief sheets in their studies, which apparatus eliminates any need for the student to search for a correct relief sheet and also obviates the possibility of his working with an incorrect relief sheet.

Another object of this invention is to provide a method and means for presenting a reproduction of a graphic figure as it is being traced by a stylus guided by a sighted person, which reproduction is in the form of point-like raised projections on a sheet of deformable writing material, such projections being at closely spaced intervals so that the shape or figure that they define is readily detectable with the finger tips and can thus be perceived by a visually impaired person.

Another object of this invention is to provide apparatus for producing relief sheets, which apparatus is adapted for cooperation with a conventional tape recorder to enable relief sheets to be made concurrently with the playing of relevant portions of a spoken recording.

With these observations and objectives in mind, the manner in which the invention achieves its purpose will be appreciated from the following description and the accompanying drawings, which exemplify the invention, it being understood that changes may be made in the precise method of practicing the invention and in the specific apparatus disclosed herein without departing from the essentials of the invention set forth in the appended claims.

Figure 2:
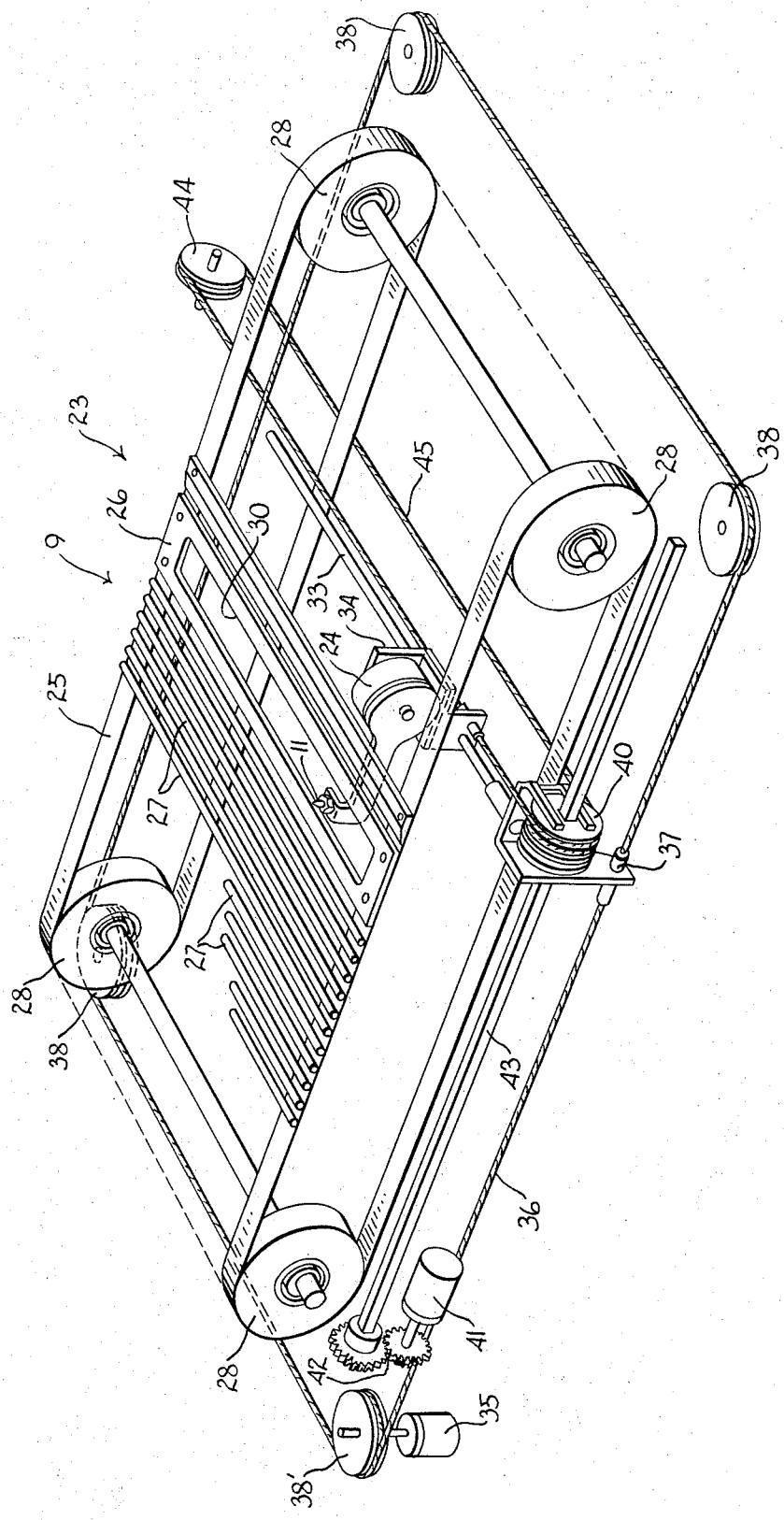

The accompanying drawings illustrate one complete example of an embodiment of the invention constructed according to the best mode so far devised for the practical application of the principles thereof, and in which:

FIG. 1 is a perspective view of apparatus embodying the principles of this invention; and FIG. 2 is a perspective view, somewhat simplified, of the operating mechanism of that portion of the apparatus by which relief sheets are produced.

Referring now to the accompanying drawings, the numeral 4 designates generally a tracing table having a generally flat upper surface 5 for holding pictorial material that is to be studied by visually impaired students, and upon which there is mounted a movable tracing stylus 6 that can be used by a sighted person to trace such material.

As explained hereinafter, output producing instrumentalities that are operatively associated with the stylus produce signals that correspond to the direction and magnitude of stylus motion. These signals can be fed to a conventional tape recorder 7 for recording, or to one or more reading devices 8, or simultaneously to both recording and reading devices.

Each reading device 8 serves to produce a relief sheet for each pictorial figure traced at the tracing table, doing so in response to electrical signals fed to it either directly from the tracing table or indirectly through the medium of a recording. In general, the reading device comprises means 9 for supporting a sheet 10 of deformable writing material, in a generally horizontal position, a striker pin 11 that is arranged to be thrust against the underside of the sheet to produce point-like projections on it, and means described hereinafter for moving the striker pin vertically into engagement with the sheet 10 and horizontally in accordance with tracing movement of the stylus 6, all in response to the above mentioned signals. As the result of such movement, the striker pin produces a pattern of point-like projections which reproduce the figure traced by the stylus and which a student at the reading machine can detect with his fingers.

Where a tape recorder 7 is used, it is preferably a two-channel machine. One channel is used to record the instructor's oral discussion, the other records the signals from the tracing table apparatus. Hence, upon subsequent play-back of the tape, with the signals from the second mentioned channel fed to a reading device 8, the apparatus of this invention enables the student to gain the same benefit from individual study as from classroom work. It will be obvious at this point that the apparatus also lends itself well to use in remote teaching situations, since signals corresponding to stylus movements and to the instructor's comments can be transmitted by telephone or radio, thus making it possible for a specially trained teacher to reach a large number of students.

Turning now to a more detailed consideration of the apparatus, the tracing table 4 has a box-like base 5, on the flat top surface of which there is a central area 5' in which pictorial material to be traced is intended to be held in place, said area being defined in part by clip or gripper means 12 for releasably engaging one or more edge portions of such material. The stylus is attached to one end of a straight normally horizontal arm 13 carried on an upright cylindrical column 14 that is secured to one corner of the tracing table. The connection between the column 14 and the stylus arm 13 comprises a holder 15 mounted on the top of the column for rotation about the axis of the column, and in which the arm is received for lengthwise sliding motion. By thus providing for the arm to have both lengthwise and swinging motion, the holder 15 allows the stylus to be moved in all directions parallel to the surface 5, so that any graphic design can be readily traced with it.

The cylindrical column 14 comprises the stator of a device, such as a selsyn, which produces electrical output signals having a characteristic that varies with the angular position of the arm 13. It will be understood that the arm holder 15 is either connected with or directly journaled on the rotatable element of such sensor.

In like manner signals are produced in response to lengthwise motion of the arm 13 relative to the holder 15, which signals have a characteristic corresponding to the distance between the stylus and the center of rotation of the arm. To that end the arm is provided with a lengthwise extending rack 16, meshing with a pinion which is journaled on the holder 15 and which is coaxially connected with the rotatable element of a signal generator 17 such as a rotary potentiometer.

It will be apparent that the electrical signals emanating from the signal generating means 14 and 17 in effect define the position of the stylus in terms of polar coordinates, as is appropriate to the structure that carries the stylus. While the stylus carrying means could be one suitable for generating signals corresponding to a rectangular coordinate (x-y system), the described arrangement is preferred because it lends itself to convenience in manipulating the stylus for tracing purposes.

However, as the description proceeds it will be seen that the reading device operates on the basis of a rectangular coordinate system, and therefore the generated signals are fed to a computer-like signal conversion device in which they are transformed into signals that signify the position of the stylus is rectangular coordinates, and it is these transformed signals that are fed to the tape recorder 7 and the reading device 8. The signal conversion apparatus, which can be of known type, can be conveniently housed in the box-like base 5 of the tracing table.

The base 5 of the tracing table can also house circuits of a known type by which the figure produced on a deformable sheet at the reading device can be enlarged or reduced relative to that being traced. A manually adjustable knob 18 on the tracing table permits the desired degree of enlargement to be selected.

Since a figure cannot always be traced in one continuous line, some movements of the stylus should not be attended by operation of the striker pin to produce raised projections. Hence the stylus can be mounted on the arm 13 for slight up and down sliding movement relative to the arm, whereby the stylus can actuate a sensitive electric switch 19 that is carried on the outer end of the arm adjacent to the stylus. When the stylus is moved downward into tracing engagement with pictorial material, the switch 19 is actuated to effect production of a signal that causes the striker pin to make its thrusts against a deformable sheet, whereas lifting the stylus for a non-tracing traverse actuates the switch to its other position, in which the striker pin remains retracted but follows the horizontal movement of the stylus. Obviously signals for such control of striker pin thrust could also be generated with the use of a manually actuated switch accessible at the tracing table.

To compensate for thickness of material to be traced (which might be in a thick book or on a single sheet) the subassembly comprising the stylus and the switch 19 is so attached to the arm 13 as to be vertically adjustable toward and from the top surface 5' of the tracing table.

Turning now to the reading device 8, it comprises a box-like base 20 that has a relatively large rectangular opening 21 in its top wall. A sheet 10 of deformable writing material can be secured across this opening by means of a pair of long, straightedged, spring loaded clips or grippers 22 that are mounted on the top surface of the base 20 at opposite sides of the opening. The clips or grippers are of course in coplanar relation, and thus define a generally horizontal plane that contains the deformable sheet.

The striker pin 11 and the structure that carries it are of course housed within the base 20, and when in operation the striker pin thrusts axially upwardly to slightly above the plane just mentioned to produce projections in the deformable sheet. The structure that carries the striker pin comprises a carriage, generally designated by 23, by which the striker pin can be translated horizontally in all directions and upon which it is mounted for axial thrusting and retracting motion.

The striker pin is normally biased downwardly to its retracted position and is driven upwardly by a tractive electromagnet 24 on the carriage, adapted to be energized with a pulsing current so as to effect a thrust of the striker pin with each current pulse. The feeding of such current is controlled by the stylus actuated switch 19, as above described. The pulsing frequency of the current is manually adjustable and is coordinated to the direction and speed of horizontal movement of the striker pin so that the projections that it produces will be substantially evenly spaced.

The portion of the deformable sheet that extends across the rectangular aperture is supported against the pressure of the student's fingers by means of a movable grid comprising a pair of endless belts 25 in the box-like base 20, near opposite sides thereof, a narrow, lengthwise slotted elongated plate 26 that bridges the belts with its opposite ends secured to them, and a plurality of spaced apart parallel rods 27 that likewise span the endless belts. The belts are trained around pulleys 28 which are journaled near the corners of the box-like base, and which are arranged to provide an upper stretch of each belt that partakes of all horizontal motion of the carriage in what can be designated the x-direction, transverse to the long dimension of the slotted plate 26 and the rods 27. Hence the slot 30 in the plate 26, which is uninterrupted through substantially the entire distance between the belts, always remains in register with the striker pin, and the latter can thrust up through that slot in any position of the carriage 23. For simplicity, the mechanism for coordinating x-direction motion of the grid with that of the carriage 23 is not illustrated in FIG. 2, since any of several well known mechanical connections can obviously be employed for the purpose.

The carriage 23 comprises a yoke 32 that is mounted for movement in the x-directions and a rail 33 that is anchored to the yoke and extends transversely to the belts 25 between their upper and lower stretches. The carriage also comprises a slider 34 which is confined to lengthwise motion along the rail 33 and upon which the striker pin and its tractive magnet actuator 24 are mounted. For simplicity, the means for confining the yoke 32 and shaft 33 to translatory x-direction motion are not shown, but it will be understood that this can comprise suitable guide rails or the like. The carriage is propelled in x-direction motion by means of an x-drive servo motor 35 that is drivingly connected with the carrier through a cord 36. The ends of the cord are anchored to the yoke, as at 37, and the cord is trained around four pulleys 38, each rotatable on an upright axis near one of the four corners of the base. Three of the pulleys 38 are freely rotatable; the fourth, designated by 38', is coaxially driven by the x-drive servo and has several turns of the cord around it to provide a tractive non-slip connection therewith.

The means for driving the carriage in the y-directions comprises a y-drive servo motor 41 that drives a y-drive pulley 40, an idler pulley 44, and a cord 45 that is trained around the y-drive pulley and the idler pulley and has its ends anchored to the sliding carrier 34. The y-drive pulley 40, which has its axis oriented in the x-directions, is embraced by the yoke 32 and is thus constrained to x-direction motion with the yoke. The driving connection between the y-drive pulley and the y-drive servo 41 comprises a noncircular shaft 43 that has a geared connection 42 with the y-drive servo and extends through a non-circular concentric hole in the y-drive pulley so that said pulley is constrained to rotate with the shaft 43 but can slide along it with motion of the yoke 32. The idler pulley 44 is located at the opposite side of the belts from the yoke and is constrained by any suitable means (not shown) to move in the x-directions in unison with the yoke. The cord 45 is trained around the idler pulley and the y-drive pulley, with several turns around the latter to have a nonslip driving connection therewith.

The x-drive servo 35 and the y-drive servo 41 are of course energized in correspondence with signals from the tracing table (or with recorded tracing table signals) and consequently the motion of the slidable carrier 34 is always such that the striker pin follows the tracing movements of the stylus.

From the foregoing description taken with the accompanying drawings it will be apparent that this invention provides a method and apparatus for quickly making graphic figures perceptible to visually impaired persons, so that the shape of a graphic figure being discussed can be communicated to a visually impaired person as the figure is under discussion, thereby avoiding any necessity for such person to search for a relief sheet containing a feelable representation of the figure.

Those skilled in the art will appreciate that the invention can be embodied in forms other than as herein disclosed for purposes of illustration.

The invention is defined by the following claims:

1. Apparatus for communicating pictorial information to visually impaired persons, of the type comprising a striker pin which is repeatedly movable axially toward and from projection-forming engagement with a sheet of deformable material, and carriage means by which the striker pin is carried and which is movable, in response to signals denoting a tracing of pictorial material, in pairs of opposite directions that are perpendicular to one another and to the striker pin axis so that the striker pin can produce a pattern of projections on deformable sheet material that corresponds to the pictorial material tracing denoted by the signals, said device being characterized by:
   A. means defining a housing for the striker pin and carriage means, which housing has a substantially large opening at one side thereof;
   B. substantially coplanar gripping means at said one side of the housing, at opposite edges of said opening, for gripping opposite edge portions of a sheet of deformable material to hold the same spanning said opening in the housing with one of its surfaces facing thereinto and its other surface readily accessible, said gripping means being arranged to substantially confine the sheet against flatwise deflection outwardly of the housing so that projections on the sheet can be detected as they are being produced by the striker pin; and
   C. a grid in the housing, extending across said opening immediately inwardly of said plane to provide support against flatwise inward deflection for the medial portion of deformable sheet material engaged by the gripping means,
      1. said grid being mounted for motion in one pair of opposite directions of motion of the carriage means and being constrained to move in unison with the carriage means in said directions, and
      2. said grid having a slot therein that extends in the other pair of opposite directions of motion of the carriage means and through which the striker pin moves axially into engagement with deformable sheet material in said plane.

2. Apparatus for producing on a sheet of deformable material point-like spaced apart projections which can be detected by touch and which cooperate in defining a reproduction of a figure that is visible on graphic material, whereby a visually impaired person is enabled to perceive the figure, said apparatus comprising:
   A. supporting means for holding a sheet of deformable material and disposing it in a predetermined plane;
   B. a striker pin having an end portion engageable with deformable material to produce projections therein that are detectable to the touch;
   C. carriage means movable relative to said supporting means for translatingly moving the striker pin in all directions parallel to said plane;
   D. means mounting the striker pin on the carriage means for translatory motion therewith and for axial projection producing motion transversely to said plane and relative to the carriage means;
   E. thrusting means reacting between the carriage means and the striker pin for imparting repeated axial motion to the striker pin;
   F. signal responsive actuating means for the carriage means by which translatory motion of the striker pin can be effected in directions and through distances denoted by signals which correspond to movements made in tracing a graphic figure to be reproduced; and
   G. a grid defining a surface that lies substantially in said plane and by which at least a medial portion of a sheet of deformable material is supported,
      1. said grid being movable in a pair of opposite directions parallel to said plane and being constrained to move in unison with components of movement of the carriage means in said directions, and 2. said grid having a slot therein through which the striker pin is axially movable and which extends transversely to said directions to accommodate components of motion of the carriage means transversely to said opposite directions.
3. The apparatus of claim 2, further characterized by:
H. said grid comprising 1. a pair of endless belts trained around pulleys and having straight, parallel, transversely spaced apart stretches extending in said directions, and
2. rod-like elements in bridging relation to said belts and extending transversely to their said stretches.

* * * * *